Sept. 4, 1956

J. M. EUBANK 2,761,293

AIR CONDITIONING SYSTEM FOR AUTOMOBILES

Filed Oct. 2, 1953

2 Sheets-Sheet 1

INVENTOR.
Joseph M. Eubank
BY

McMorrow, Berman & Davidson
ATTORNEYS

INVENTOR.
Joseph M. Eubank

United States Patent Office 2,761,293
Patented Sept. 4, 1956

2,761,293

AIR CONDITIONING SYSTEM FOR AUTOMOBILES

Joseph M. Eubank, San Angelo, Tex.

Application October 2, 1953, Serial No. 383,774

1 Claim. (Cl. 62—141)

This invention relates to an air conditioning system for an automotive vehicle, such as a passenger automobile, and more particularly to a system for cooling the air in the vehicle in warm weather.

It is among the objects of the invention to provide an improved air cooling system for an automobile which makes use of the existing heating equipment as an air cooling radiator; which utilizes a refrigeration system driven by the automobile engine and a cooler for supplying cooling fluid at a low temperature to the existing heating equipment; which can be installed in an automobile with no material change in the automobile construction; and which is simple and durable in construction, economical to manufacture, and effective and efficient in operation.

Figure 1:
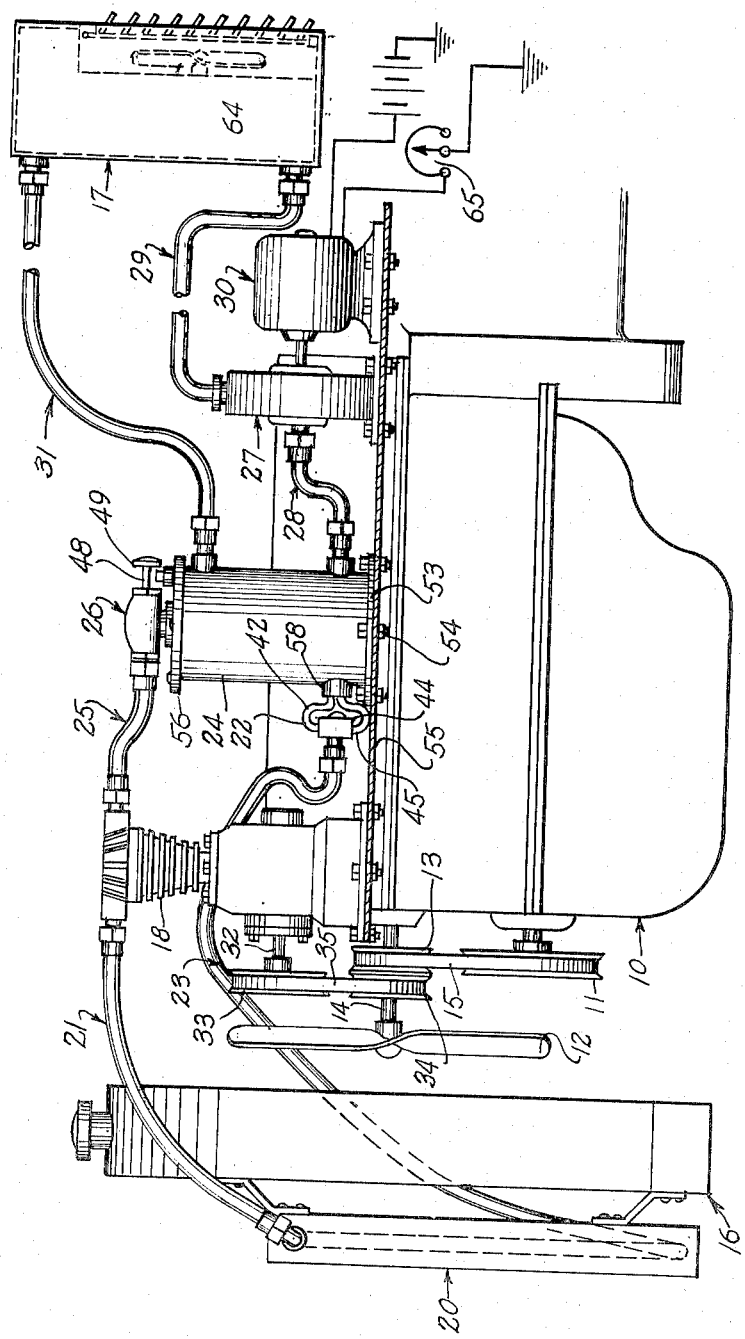
Figure 2:
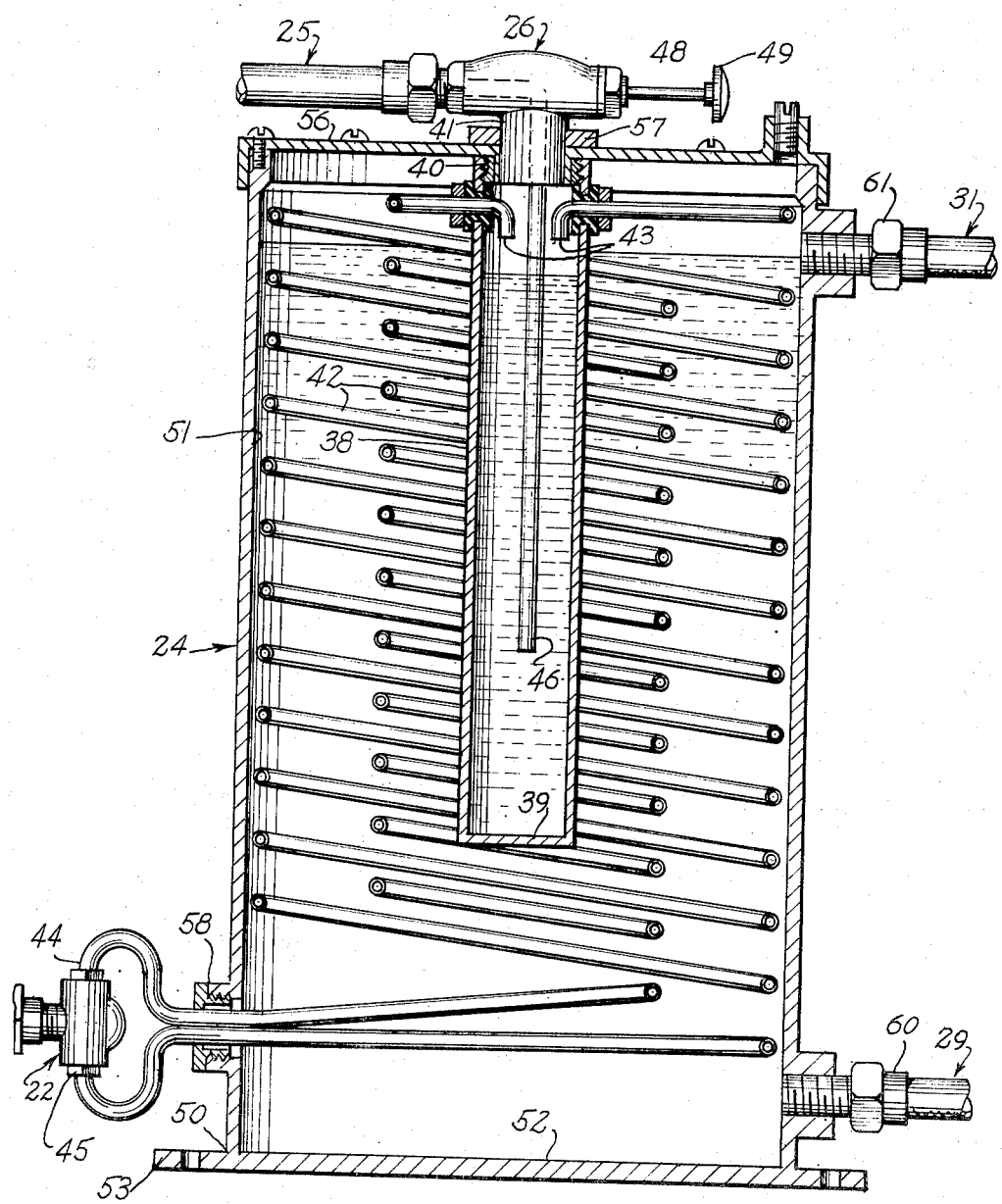

Other objects and advantages will become apparent from a consideration of the following description and the appended claim in conjunction with the accompanying drawings wherein:

Figure 1 is a somewhat diagrammatic illustration of a cooling system illustrative of the invention disposed in association with an automobile engine, engine cooling radiator and automobile heater; and Figure 2 is a longitudinal medial cross sectional view through a cooler constituting an operative component of the system of the invention.

With continued reference to the drawings, the numeral 10 generally indicates an automobile engine having at its front end a crankshaft driven belt pulley 11, a cooling fan 12, and a fan and water pump belt pulley 13 mounted on the fan shaft 14 and driven by a V-belt 15 from the belt pulley 11. The numeral 16 generally indicates a cooling radiator mounted at a location spaced from the front end of the engine 10 and connected to the cooling system of the engine by suitable hose connections, not illustrated, and the numeral 17 generally indicates a heating unit mounted in the body of the automobile and supplied, ordinarily, with hot water from the engine cooling system to heat the air in the automobile body.

As the automobile engine, radiator and the heater may be of any desired construction, and may be of a form well known to the art, a more detailed illustration and description thereof is considered unnecessary for the purposes of the present disclosure.

The air conditioning or cooling system of the present invention includes, in general, a refrigerant compressor 18 mounted on and driven by the engine, a refrigerant condenser 20 disposed in front of the engine cooling radiator 16 and having an inlet connected to the outlet of the compressor 18 by a flexible conduit 21, an expansion valve 22 connected by a flexible conduit 23 to the outlet of the condenser 20, a cooler 24 connected to the expansion valve 23 and connected to the inlet of the compressor 18 by a flexible conduit 25 and a manually operated valve 26, a circulating pump 27 having an inlet connected to an outlet of the cooler 24 by a flexible conduit 28 and having an outlet connected to the inlet of the heater 17 by a flexible conduit 29, a variable speed motor 30 driving the pump 27 and a flexible conduit 31 connecting the outlet of the heater 17 to an inlet of the cooler 24.

As the compressor 18, condenser 20, pump 27 and motor 30 may be of a known or desired construction, it has not been considered necessary to illustrate and described these elements in detail for the purposes of the present disclosure, the cooler 24 being illustrated in detail in Figure 2, and later described in detail.

The compressor 18 has a shaft 32 carrying a belt pulley 33 and a belt pulley 34 is mounted on the fan shaft 14 beside the fan belt pulley 13 and is drivingly connected to the compressor pulley 33 by a belt 35, so that the compressor will be driven while the engine 10 is in operation.

The cooler 24, as illustrated in detail in Figure 2, comprises an accumulator 38 in the form of an elongated, hollow cylinder disposed in upright position and having its lower end closed by an end wall 39 and its upper end provided with an internally screw threaded opening 40 receiving an externally screw threaded leg 41 of the valve 26. A double, spirally wound expansion coil 42 surrounds the accumulator 38 and is connected at its upper end to the interior of the accumulator near the upper end of the latter, as indicated at 43. At its other end the expansion coil 42 is connected to the expansion valve 22, as indicated at 44 and 45, and a draft tube 46 extends through the interior of the accumulator 38 from a location near the bottom wall 39 of the accumulator into the valve 26.

With this arrangement, compressed refrigerant, such as Freon gas, is forced from the outlet of the compressor 18 through the conduit 21 into the condenser 20 where it is condensed to liquid form and forced through the conduit 23 to the expansion valve 22. From the expansion valve the refrigerant is evaporated in the expansion or evaporation coil 42 where it takes up heat, and is discharged from the expansion coil into the accumulator 38 from which it passes through the draft tube 46 into the valve 26 and from the valve 26 through the conduit 25 back to the compressor 18 to be again forced through the condenser 20 where it gives up its heat taken from the expansion coil 42.

The valve 26 is provided with a valve shaft 48 and a handwheel or knob 49 mounted on the outer end of the valve shaft, so that the valve can be operated to restrict or discontinue the passage of the refrigerant from the accumulator or receiver 38 back to the compressor 18, when desired.

A water jacket 50 of cylindrical shape encloses the accumulator 38 and the expansion coil 42 and has a cylindrical side wall 51, a permanently attached bottom wall 52 provided with an outwardly projecting apertured flange 53 for receiving hold down bolts 54 which secure the heat exchanger 24 on a support 55, and with a detachably mounted top wall 56 having a central opening through which the valve leg 41 extends and in which the valve leg is sealed by suitable means, such as the collar 57.

The expansion coil 42 extends through the side wall 51 of the jacket to the expansion valve 22 near the bottom wall of the jacket and is sealed to the side wall 51 by a packing assembly 58. Fittings 60 and 61 project from the side wall of the water jacket near the bottom wall 52 and the top wall 56 respectively, to connect the conduits 29 and 31 to the water jacket in communication with the interior thereof.

The water jacket, the pump, the heater and the conduits 28, 29 and 31, are all filled with a solution of water and a suitable antifreeze material and, when the compressor 18 is in operation, this water solution is cooled in the heat exchanger 24 and forced by the pump 27 through the heater unit 17. The heater unit fan 64, forcing air through the refrigerated heater unit core discharges cooled air into the automobile body in which the heat unit is installed. The pump motor 30 is provided with a manually operated control switch 65, so that the motor can be started and stopped and its speed regulated, as desired, to control the rate of flow of the water solution through the core of the heater unit 17.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalence of the claim are, therefore, intended to be embraced therein.

What is claimed is:

A heat exchange device for water cooling apparatus including a closed refrigerant circuit and a closed water circuit, comprising: a cylindrical water jacket having an inlet and an outlet at its opposite ends for connecting the jacket in the second circuit; a cylindrical accumulator extending axially of and within the jacket from one end of the jacket, the accumulator having at said one end of the jacket a single outlet into the first circuit; a tube extending axially of and within the accumulator and having an inlet communicating with the interior of the accumulator adjacent the other end of the accumulator, and having an outlet extending into communication with the accumulator outlet; separate coils in the jacket coaxial with and surrounding the accumulator, the coils having outlet ends extending into the accumulator adjacent the accumulator outlet and having inlet ends outside the jacket; and an expansion valve to connect the coils at their inlet ends in the first circuit, having a single inlet adapted for connection to the first circuit and a pair of outlets connected to the respective inlet ends of the coils.

References Cited in the file of this patent

UNITED STATES PATENTS

| | | |
|---|---|---|
| 1,529,014 | Dennedy | Mar. 10, 1925 |
| 2,128,794 | Billings | Aug. 30, 1938 |
| 2,667,045 | McCarty | Jan. 26, 1954 |